Oct. 1, 1968  J. H. MacBLANE  3,404,299

ELECTROMAGNETIC CONVEYOR MOTOR

Filed April 20, 1966

INVENTOR
*James H. MacBlane.*

United States Patent Office 3,404,299
Patented Oct. 1, 1968

3,404,299
ELECTROMAGNETIC CONVEYOR MOTOR
James H. MacBlane, Rte. 119, Homer City Road,
Indiana, Pa. 15701
Filed Apr. 20, 1966, Ser. No. 543,944
3 Claims. (Cl. 310—17)

ABSTRACT OF THE DISCLOSURE

An electromagnetic vibrator for imparting vibrations to materials handling devices such as conveyors and feed hoppers including a housing having a radial flange, rubber bushings mounted on the flange by threaded studs, a core and coil mounted in the housing; a metal plate having an armature secured to it, the plate being mounted on the studs against the rubber bushings. Nuts on the bushings limit movement of the plate away from the coil.

---

This invention relates to materials handling, and more particularly to conveyors used in this art, and still more particularly to conveyors that are activated by an electric magnetic conveyor rather than employing an endless belt or screw for the movement of its contents.

This invention relates to my previously filed application for U.S. patent, filed on Apr. 5, 1965, having Ser. No. 445,649 for my invention of an Electric Magnetic Vibrator to be secured to the outside of any hopper, chute or similar container.

The principal object of my present invention is to provide an electric magnetic conveyor of the character described comprising in part an electric magnetic device that will cause the material to move in the conveyor of which this device is a part.

Another object of this invention is to provide an electric magnetic conveyor that embodies a material moving mechanism adapted to the outside and one end of the conveyor, thereby presenting a simplified and efficient conveyor having all of its repalceable parts so located that they can easily be reached for maintenance from time to time.

Still another object of this invention is to provide an electric magnetic conveyor that can be manufactured in any desired shape and size for the movement of any material that is in either powdered, bulk or granular form by means of the herein described electric magnetic unit that forms a part of this present in invention.

Other and further objects and advantages of this invention will become apparent as the description of the invention proceeds and the attached drawing is examined.

In the drawing.

In the attached drawing, like parts are indicated by like reference characters throughout the different views of this invention and its component parts.

Figure 1:
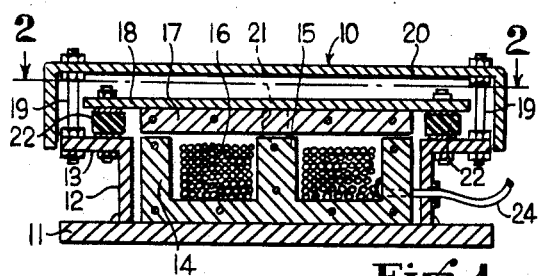
FIG. 1 is a sectional view of the electric magnetic part of this invention taken along line 1—1 of FIGURE 2 and viewed in the direction indicated by the arrows.
Figure 3:
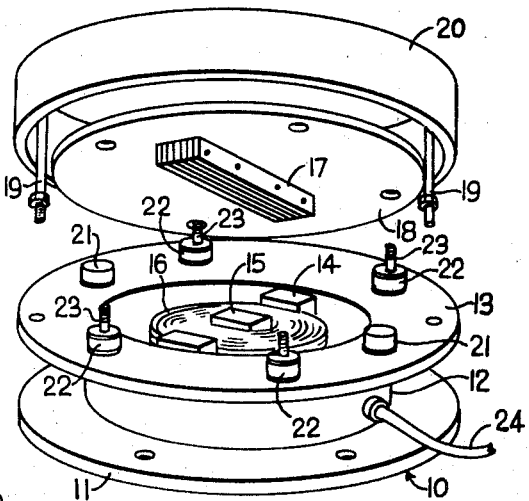
FIG. 3 is an exploded pictorial view of the electric magnetic part of this invention.

Referring to the attached drawing, it will be seen that an electric magnetic device or unit is the predominating part of this invention and is indicated by the reference number 10. The just-mentioned electric magnetic device consists of a disk 11 to the top of which is welded or otherwise secured the lower end of the tubular housing 12 having an outwardly turned formed flange 13 on the upper end thereof. The diameter of the aforesaid disk 11 is the same diameter as that of the jut-noted flange 13, as one can clearly see by looking at FIGURE 1 of the attached drawing where it is also seen that an iron member 14 having a basic cross-sectional shape along its longitudinal axis of the letter W is located within the aforesaid tubular housing 12. The ends of the iron member 14 are parallel to the inside surface of the aforesaid tubular housing 12, while the center portion of the same iron member rises vertically to form a core 15 around which is wound the coil of electric wire 16. An armature 17 of the same width and length as the aforesaid iron member 14 is suitably secured to the underside of the armature disk 18 which is slightly smaller in diameter than the aforesaid flange 13 in order to allow room for the two diametrically opposite screws 19 to secure the cover 20 to this electric magnetic device 10 to the flange 13.

Figure 2:
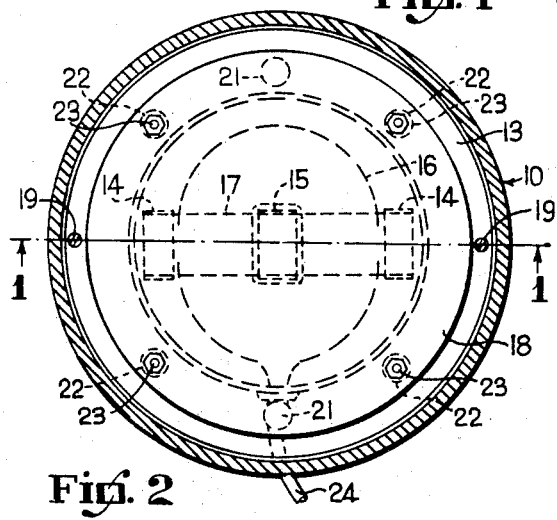
FIG. 2 is a sectional view of FIGURE 1 taken along line 2—2 and viewed in the direction indicated by the arrows.

Looking again at FIGURES 1 and 2 of the attached drawing, it will be seen that the aforesaid armature plate 18 rests on top of the two diametrically and oppositely located vertically diposed power transmision block 21 which are shown to be cylindrical in shape and which are mounted on top of a metal screw that is screwed down into the aforesaid flange 13. The aforesaid armature plate 18 is held in place over top of the iron member 14 by means of a plurality of equally spaced flexible resilient springs 22 that are located around the underside of the often mentioned armature plate 18 to which they, the springs, are secured by means of a threaded stud 23 that extends upwardly from the center of each end of the aforesaid resilient springs 22, one stud going down through the flange 13, and the other stud up through the aforesaid armature plate 18. The flexible resilient springs 22 are of rubber or any other desired material.

Figure 4:
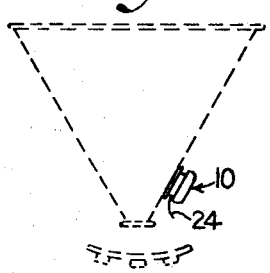
FIG. 4 is a side view of the electric magnetic part of this invention secured to the side of a chute which is shown in phantom lines.
Figure 6:
FIG. 6 is a longitudinal sectional view of part of one of the springs of this invention.
Figure 7:
FIG. 7 is a longitudinal sectional view of an optional form of one of the springs of this invention.
Figure 8:
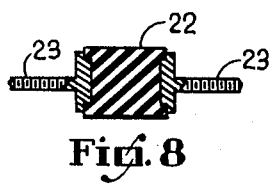
FIG. 8 is a longitudinal sectional view of another form of one of the springs of this invention.

From reading the above description of the electric magnetic device or unit part of this invention, along with an examination of the attached drawing, it will be clear to anyone experienced in the arts that I have provided a means of vibrating or shaking any material that is placed in any hopper, chute, or similar container to which the aforesaid device is attached by a plurality of screws passing through openings in the aforesaid disk 11, and that when the coil of electric wire 16 has its connecting wire 24 connected to a split wave rectifier control box having a switch, fuse, and rheostat which is connected to any suitable source of electricity, the material in the hopper, chute or similar container will be vibrated to the extent that it, the material, will move in the tilted or downward direction of the container or the like. One form of hopper is shown in phantom lines in FIGURE 4 of the drawing where it will be seen that the electric magnetic device is attached to one lower side of the aforesaid hopper.

Figure 5:
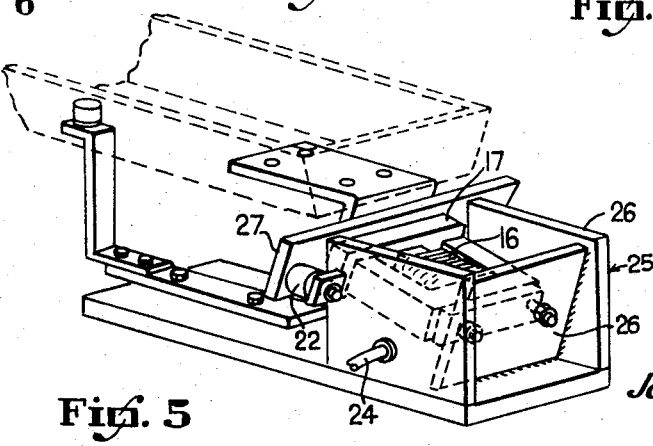
FIG. 5 is a pictorial view of one end of this invention of an electric magnetic conveyor.

FIGURE 5 of the attached drawing illustrates one end of a chute which is also shown in phantom lines and to which is secured a slightly modified form of an electric magnetic device or unit which is housed in a squared container 25 that is made up of plates 26. In this modified form of the electric magnetic device, the armature plate is shown to be rectangular and to be indicated by the reference number 27.

From the foregoing it will be seen that I have provided an electric magnetic conveyor of the character described which meets all of the objects of the invention as set forth in the first part of this specification as well as others that will come to mind by those experienced in the art, and that the invention is subject to any and all changes and/or modifications that may come to mind in so long as the changes and/or modifications fall within the scope and intent of the appended claims.

What I now claim as new is:

1. An electromagnetic vibrator for imparting vibrations to a materials handling device, said vibrator comprising: a housing including a base, a peripheral sidewall projecting axially from said base and a radially outwardly extending flange on said sidewall near the end thereof opposite the base; securement means on said housing for mounting the vibrator on a materials handling device; a ferromagnetic core secured in said housing; a wire coil received on said core facing outwardly of the housing base and constructed and arranged for connection to a supply of pulsating electric current; a metal plate; an armature secured to the underside of said metal plate in the central region thereof, said metal pate extending laterally beyond said armature throughout the perimeter thereof; means defining a plurality of angularly spaced, longitudinally directed openings on said housing flange; a threaded stud secured in each opening and having a portion projecting axially from the housing flange away from the housing base; a body of resilient material received adjacent the housing flange on each stud, so that part of each stud projecting portion extends beyond each respective body of resilient material; means defining a plurality of angularly spaced longitudinally directed openings in said metal plate, spaced radially outwardly from said armature; the openings in said plate corresponding in placement to respective of said openings in said housing flange; said stud projecting portion parts received through respective of said plate openings so that said plate is supported on the bodies of resilient material with the armature facing the coil; and securement means received on said studs limiting movement of the plate away from the coil.

2. The electromagnetic vibrator of claim 1 wherein the bodies of resilient material each comprise an annular body of rubber received on each respective stud.

3. The electromagnetic vibrator of claim 2 further comprising a cover removably secured to the housing and extending from the outer periphery of said housing flange, over the plate and armature, thereby closing the opposite end of the housing from the base.

References Cited

UNITED STATES PATENTS

| 2,746,599 | 5/1926 | Weyandt | 198—220 |
| 2,832,462 | 4/1958 | Simer | 198—220 |
| 2,914,161 | 11/1959 | Black | 198—220 |
| 3,167,670 | 1/1965 | Spurlin | 310—29 |

FOREIGN PATENTS 916,381   8/1954   Germany.

MILTON O. HIRSHFIELD, *Primary Examiner.*

D. F. DUGGAN, *Assistant Examiner.*